March 25, 1969    C. H. HAMILTON    3,434,691
VALVE
Filed Oct. 12, 1964
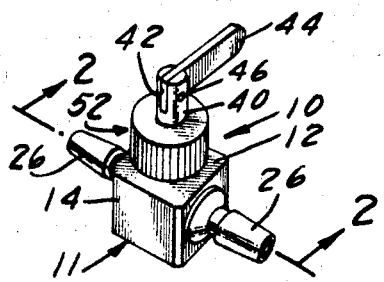
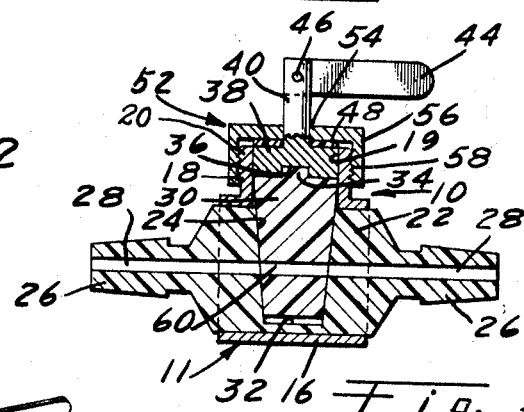
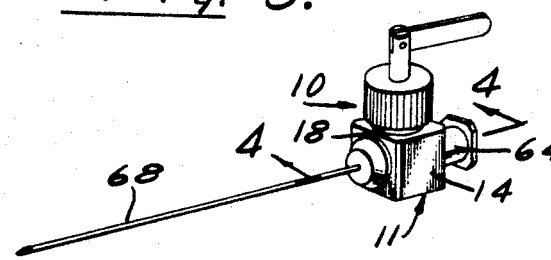
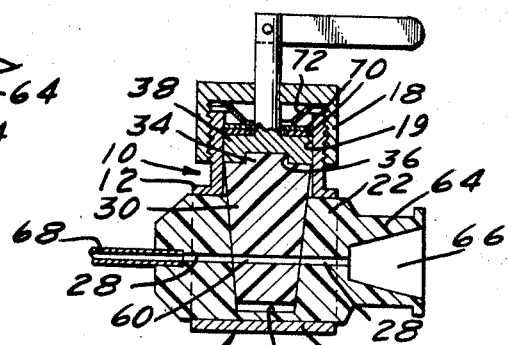
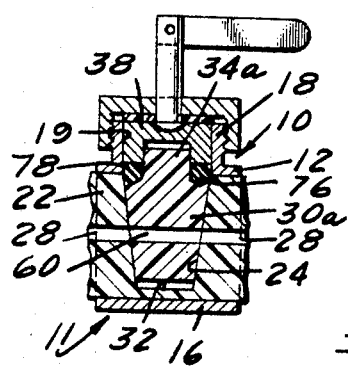
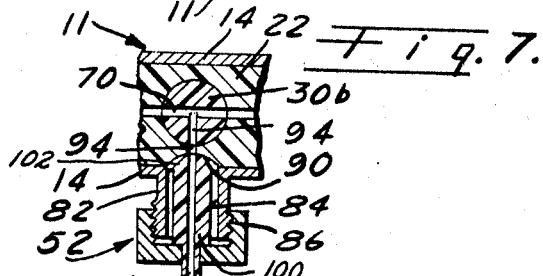
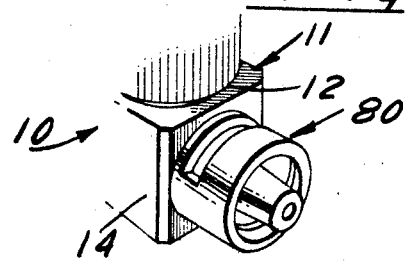
Clark H. Hamilton,
INVENTOR.
BY J. B. Barack
Attorney United States Patent Office 3,434,691
Patented Mar. 25, 1969

3,434,691
VALVE
Clark H. Hamilton, 707 Whitley St.,
Whittier, Calif. 90601
Filed Oct. 12, 1964, Ser. No. 403,223
Int. Cl. F16k 5/02, 27/06
U.S. Cl. 251—184               14 Claims This invention relates generally to valves and relates more particularly to improvements in a plug type valve.

While the invention has particular utility in connection with plug type valves and is shown and described in such connection it is to be understood that its utility is not confined thereto.

As is well known, difficulties have been encountered in solving the problem of providing a leak proof plug type valve for scientific purposes wherein relatively high pressures are involved, and it is an object of the present invention to provide a plug type valve which solves this problem and overcomes the difficulties thereof.

It is another object of the invention to provide a valve of this character that will not leak under pressures as high as 100 p.s.i.

It is still another object of the invention to provide a valve of this character that is gas-tight when used in connection with such pressures.

It is a further object of the invention to provide a valve of this character that the has novel sealing means to prevent leakage under pressures such as described above.

It is a still further object of the invention to provide a valve of this character which will automatically accommodate to wide tempertature ranges.

It is another object of the invention to provide a valve of this character that requires no lubrication, that is a valve that is self lubricating.

Still another object of the invention is to provide a valve of this character having novel means for connection with fluid lines or conduits.

A further object of the invention is to provide a valve of this character having a body of plastic which may be accurately machined.

A still further object of the invention is to provide a device of this character having a body of plastic disposed in a restraining housing which not only permits accurate machining of the taper of the recess for the plug but also restrains cold flowing of the plastic body.

Another object of the invention is to provide a device of this character wherein the body and the plug are of plastic.

Still another object of the invention is to provide a valve of this character that is simple in construction.

A further object of the invention is to provide a valve of this character that is reliable in use and operation.

The characteristics and advantages of the invention are further sufficiently referred to in connection with the following detailed description of the accompanying drawings which represent certain embodiments. After considering these examples skilled persons will understand that many variations may be made without departing from the principles disclosed and I contemplate the employment of any structures, arrangements or modes of operation that are properly within the scope of the appended claims.

Referring to the drawings, which are for illustrative purposse only:

FIG. 1 is a perspective view of a valve embodying the present invention;

FIG. 2 is an enlarged sectional view taken on line 2—2 of FIG. 1;

FIG. 3 is a perspective view of an alternative arrangement;

FIG. 4 is an enlarged sectional view taken on line 4—4 of FIG. 3;

FIG. 5 is a similar sectional view of another alternative arrangement;

FIG. 6 is a perspective view of still another alternative termination arrangement; and FIG. 7 is a fragmentary sectional view showing another termination arrangement.

Referring more particularly to FIGS. 1 and 2 of the drawings, there is shown a valve embodying the present invention, said valve including a hollow metal housing indicated generally at 10, providing a valve body restraining part which includes top, bottom and side walls 12, 14 and 16, respectively, said housing being open at both ends. The top wall 12 has an upstanding or outwardly extending tubular neck 18 that is hollow, having a cylindrical passage 19 therethrough. The neck 18 is open at its outer end and communicates at its inner end with the interior of the valve body restraining part, said neck having an outer end portion 20 that is externally threaded.

Within the valve body restraining part there is a valve body 22 of suitable plastic material, such as, for example, fluorocarbon resins. Examples of such fluorocarbon resins are "Teflon" which is the trademark of the Du Pont Company for their fluorocarbon resins, and "Kel F," which is the trademark of the Minnesota Mining and Manufacturing Company for their fluorocarbon resins.

This plastic valve body is formed with an exterior shaped to the cross sectional shape of the interior of the housing part 11, and when said body is at room temperature, which will be considered its normal temperature, its cross sectional dimensions are somewhat greater than the cross sectional size of the interior of the body restraining part 11 of the housing.

Before insertion into the body restraining part 11 of the housing the temperature of the body 22 is reduced. In other words, the body 22 is chilled, thereby causing said body to contract sufficiently so that it can be inserted into said housing part 11. When thus inserted and properly positioned in the housing part 11 the temperature is allowed to return to normal. As the temperature rises the body 22 expands. However, since its external cross sectional dimensions are greater than the internal size of the housing part 11 when the body is at normal temperature, said body is restrained by the housing part 11 and is held in compression therein so as to be securely retained in said housing part.

After the body 22 has returned to its normal temperature and is compressed in the housing part 11, said body is machined; that is, a plug recess 24 is machined in the body. It has been found that much greater accuracy in machining is possible with the plastic body restrained in the housing and under compression.

Various terminals or terminations may be provided, there being oppositely extending tapered male luers 26 of the usual character provided at the ends of the plastic body 22, said luers being shown as integral with the body 22. There are passages 28 extending inwardly from the free ends of the luers 26, said passages having their inner ends in communication with the plug recess 24.

Plug recess 24 is inwardly tapered with the inner end smaller than the outer end, said plug recess being aligned with the interior passage 19 of the neck 18 and receives a tapered plug 30 of suitable plastic material such as described above. It has been found that excellent results are secured by having the body 22 of one plastic material and the plug 30 of another plastic material. For example, the body 22 may be of "Kel F" and the plug 30 of "Teflon."

The taper of the plug 30 corresponds to the taper of the recess 24 and said plug 30 is longer than the depth of the plug recess but is so formed that when the plug is operable and fully seated in said recess the inner end of said plug is spaced from the bottom of said recess 24, as clearly shown in FIG. 2, the bottom of said recess being closed by a wall 32.

An upper end portion of the plug extends upwardly into the lower end portion of the interior passage 19 of the neck and has a diametrically extending tongue 34 at the upper end for removable reception in a diametrically extending groove 36 in the bottom of a cylindrical compression plate 38 which is rotatably disposed in the cylindrical interior passage 19 of the neck 18. While this tongue and groove arrangement is shown and described, the parts may be reversed with the groove in the plug and the tongue on the underside of said compression plate 48, or any other suitable releasable connection may be provided.

Compression plate 38 has an upwardly or outwardly extending axial stem 40 having a slot 42 extending a limited distance longitudinally from the outer or free end thereof for reception of an end portion of a handle 44. The depth of the slot 42 is substantially the same as the width of the handle and a pin 46 in aligned openings provided therefor in the parts of the stem at the side of the slot 42 secure the handle in position in the slot and at substantially right angles to said stem.

The outer end of the compression plate 38 is adjacent the plane of the outer end of the neck 18 and there is a washer 48 disposed on said stem, the bottom washer resting on the top side of the compression plate. This washer is of "Kel F" although it may be of any other suitable material, it having been found that excellent results are secured with washers having the characteristics of "Kel F" or similar characteristics.

With the parts thus assembled, at least a portion of the washer 48 extends outwardly of the outer end of the neck 18.

An externally knurled compression cap, indicated generally at 52, is provided and includes an end wall 54 having an axial opening therein for operable reception of the stem 40, and a cylindrical wall 56 extending axially from said end wall, the cylindrical wall 56 being provided with internal threads 58 for threadable connection with the external threads of the neck 18. When the cap is screwed onto the neck the inner side of the end wall 54 engages the outer end or side of the washer 48 and urges said washer, compression plate 38 and plug 30 inwardly so as to put the plug under some compressive force in the recess 24.

With the plug 30 in operable position, as shown in FIG. 2 and described hereinabove, a diametrical fluid passage 60 provided therein is movable into alignment with the passages 28 and out of such alignment in accordance with the rotatable positioning of said plug 30 for opening or closing the valve and thereby controlling fluid flow therethrough.

Referring to the arrangement of FIGS. 3 and 4, there is shown an alternative arrangement. In this arrangement the body 22 has a female luer hub 64 which is of well known characteristics, the outer end of one of the passages 28 of the body 22 communicating with the inner end of the recess 66 of said hub. At the opposite end of the body 22 one end of a needle 68 is secured in the usual manner and in communication with the outer end of the other passage 28 of the plastic body 22.

In this arrangement of the invention the outer end of the compression plate 38 is positioned inwardly of the outer end of the neck and one or more washers 70 are disposed on the stem 40 and on top of the compression plate, two washers being shown on the stem. Means is provided for putting the plug under yielding longitudinal compression, said means including a Belleville spring 72 disposed on the stem 40 with the smaller end resting on top of the adjacent washer. By screwing the cap 52 onto the neck 18 a sufficient distance the spring 72 is put under load. The pressure thus created is transmitted to the upper end of the plug 30 through the washers 70 and compression plate 38.

The valve of this embodiment of the invention will also be leaktight at as much as 100 p.s.i. of air. An additional advantage of this embodiment of FIGS. 3 and 4 is that because of the yielding characteristics of the spring, the valve may be used under wide temperature conditions, such as, for example, ± 100° C.

By having the above described arrangement of the parts and the plug 30 under longitudinal compression, the valve has been found to be leaktight at as much as 100 p.s.i. of air.

Referring to FIG. 5, there is shown an alternative arrangement which comprises a plug 30a modified for an alternative means for putting the plug under yielding longitudinal compression or pressure. In this arrangement the tongue, indicated at 34a, is somewhat longer than the tongue 34 and at the base of said tongue 34a there is an annular groove 76 in the upper end of said plug 30a, said groove 76 having the cross sectional shape of a wide V. Within the groove 76 is a resilient sealing means which may be of any suitable character such as an O-ring 78 of suitable material. For example, one of the plastics above referred to may be used or said sealing means may be of other suitable material such as rubber, natural or synthetic.

O-ring 78 is put under compression by the compression plate 38, as shown in FIG. 5, to thereby put the plug 30a under longitudinal compression. This O-ring also serves as a seal between the upper end of the plug and adjacent portions of the body 22 and inner passage of the neck 18, it being noted that the O-ring extends downwardly in the plug recess 24 and upwardly into the lower end portion of the neck passage 19.

In FIG. 6 there is shown a valve having a male luer lock termination fitting 80. This fitting is of a standard well known type and need not be described further.

Another type of terminal arrangement is shown in FIG. 7, wherein there is a lateral connection which includes a laterally extending neck 82 having a cylindrical passage 84 therethrough, the neck 82 having an externally threaded free end portion 86.

The body 22 has a concave recess 90 therein in alignment with the passage 84 through said neck, thereby providing a socket from which a fluid passage 92 extends inwardly in the same plane as the passages 28 of the body 22. In this arrangement the plug is indicated at 30b and has a fluid passage 94 extending laterally from the diametrical passage 70. The fluid passages in the plug may be selectively connected with the respective passages 28 and the passage 92 in the well known manner to provide various arrangements of fluid flow through the valve.

There is a fluid conduit 98 terminating in a terminal or connector member, indicated generally at 100, which includes an enlarged convex end part 102 which mates with the socket 90. Fluid passage means 104 extends through the conduit and the terminal or connector member 100 for registration or alignment with the passage 92 in the body of the valve. Cap 52 screws the terminal part of the fluid conduit in the neck and socket 90.

I claim:
1. In a plug valve mechanism for controlling the flow of fluid:
   (A) a body of plastic material, said body having an inwardly tapered recess and fluid flow passages connected therewith;
   (B) a rigid housing on at least a portion of said body compressively restraining said body;
   (C) a plastic tapered plug valve member operably disposed in said recess for rotation therein, said plug valve member having passage means movable into and out of communication with the body passages;
   (D) and resilient means for urging said valve member inward in said recess.

2. In a plug valve mechanism for controlling the flow of fluid:
   (A) a body of plastic material, said body having a recess for a plug valve member and fluid flow passages connected therewith;

(B) a rigid housing on at least a portion of said plastic body, said housing including a tubular neck and said plastic body having a concave socket aligned with said neck, one of the passages of said body having one end connected with said socket;

(C) a rotatable plug valve member operably disposed in said recess and having fluid passage means movable into and out of communication with the passages of said body;

(D) a cap screw threadably disposed on said neck, said cap having an end wall with an opening therethrough;

(E) and a fluid flow conduit extending through said opening in said cap and having a terminal part, including
   (a) an enlarged convex head at the inner end of said cylindrical part seated in the socket of said body, said cap engaging a portion of said terminal part for securing said convex head in said socket.

3. A plug valve mechanism for controlling the flow of fluids, comprising:

(A) a body of plastic material having an inwardly tapering recess for a rotatable plug valve member, said recess being closed at its inner smaller end, said body having fluid flow passages therein connecting at their inner ends with said recess at diametrically opposite sides;

(B) a hollow, tubular housing of rigid material about at least a portion of said body and restraining said body under compression, said housing being open at the ends and having a neck normal to said housing, said neck having a cylindrical passage therethrough communicating with the outer end of said recess and being of at least the same diameter as said outer end of said recess and in axial alignment therewith;

(C) a rotatable tapered plastic plug valve member operably disposed in said recess and having a diametrically extending fluid flow passage therethrough adapted to have its ends connected and disconnected with the inner ends of said body passages upon appropriate rotation of said plug valve member, said plug valve having a diametrical, upstanding tongue at its outer end,
   (a) said outer end of said plug valve member extending into the inner end of said cylindrical passage of the housing neck,
   (b) and the inner end of said plug valve member being spaced from the closed end of the recess in said plastic body;

(D) a cylindrical pressure plate rotatably disposed in said neck passage and having a diametrical groove in the inner side in which the tongue of the plug valve member is disposed whereby rotation of said pressure plate effects rotation of said plug valve member;

(E) a stem for said pressure plate, said stem extending axially outwardly of said plate and neck;

(F) a pressure plate operating handle on said stem;

(G) a washer on said stem and positioned at the outer side of said pressure plate;

(H) a spring on said stem at the outer side of said washer, said spring extending outwardly beyond the outer end of said neck;

(I) and a cap threadably connected with said neck, said cap having an end wall with an opening therein operably receiving said stem, said end wall engaging the outer end of said spring and compressing same to thereby exert pressure on said pressure plate and hence the plug valve member.

4. A plug valve mechanism for controlling the flow of fluids, comprising:

(A) a body of plastic material having an inwardly tapering recess for a rotatable plug valve member, said recess being closed at its inner smaller end, said body having fluid flow passages therein connecting at their inner ends with said recess at diametrically opposite sides;

(B) a hollow, tubular housing of rigid material about at least a portion of said body and restraining said body under compression, said housing being open at the ends and having a neck normal to said housing, said neck having a cylindrical passage therethrough communicating with the outer end of said recess and in operable alignment therewith;

(C) a rotatable, plastic tapered plug valve member operably disposed in said recess and having a diametrically extending fluid flow passage therethrough adapted to have its ends connected and disconnected with the inner ends of said body passages upon appropriate rotation of said plug valve member, said plug valve having a diametrical, upstanding tongue at its outer end;

(D) a cylindrical pressure plate rotatably disposed in said neck passage and having a diametrical groove in the inner side in which the tongue of the plug valve member is disposed whereby rotation of said pressure plate effects rotation of said plug valve member;

(E) a stem for said pressure plate, said stem extending axially outwardly of said plate and neck;

(F) a pressure plate operating handle on said stem;

(G) a washer on said stem and positioned at the outer side of said pressure plate; and (H) a cap threadably connected with said neck, said cap having an end wall with an opening therein operably receiving said stem, said end wall engaging the outer end of said washer and exerting inward pressure thereon and on said pressure plate and hence the plug valve member.

5. A plug valve mechanism for controlling the flow of fluids, comprising:

(A) a body member of plastic material having an inwardly tapering recess for a rotatable plug valve member, said recess being closed at its inner smaller end, said body having fluid flow passages therein connecting at their inner ends with said recess at diametrically opposite sides;

(B) a hollow, tubular housing of rigid material about at least a portion of said body and restraining said body under compression, said housing being open at the ends and having a neck normal to said housing, said neck having a cylindrical passage therethrough communicating with the adjacent end of said recess and being in operable alignment therewith;

(C) a rotatable tapered plastic plug valve member operably disposed in said recess and having a diametrically extending fluid flow passage therethrough adapted to have its ends connected and disconnected with the inner ends of said body passages upon appropriate rotation of said plug valve member, said plug valve having a diametrical, upstanding tongue at its outer end,
   (a) said outer end of said plug valve member extending into the inner end of said cylindrical passage of the housing neck,
   (b) and the inner end of said plug valve member being spaced from the closed end of the recess in said plastic body,
   (c) one of said members being of "Teflon" and the other of "Kel F";

(D) a cylindrical pressure plate rotatably disposed in said neck passage and having a diametrical groove in the inner side in which the tongue of the plug valve member is disposed whereby rotation of said pressure plate effects rotation of said plug valve member;

(E) a stem for said pressure plate, said stem extending axially outwardly of said plate and neck;

(F) a pressure plate operating handle on said stem;

(G) a washer on said stem and positioned at the outer side of said pressure plate; and (H) a cap threadably connected with said neck, said cap having an end wall with an opening therein operably receiving said stem, a part of said cap engaging said washer and pressing same inwardly to thereby exert pressure on said pressure plate and hence the plug valve member.

6. A plug valve mechanism for controlling the flow of fluids, comprising:
(A) a body of plastic material having an inwardly tapering recess for a rotatable plug valve member, said recess being closed at its inner smaller end, said body having fluid flow passages therein connecting at their inner ends with said recess;
(B) a hollow, tubular housing of rigid material about at least a portion of said body and restraining said body under compression, said housing being open at the ends and having a neck normal to said housing, said neck having a cylindrical passage therethrough communicating with the adjacent end of said recess and in operable alignment therewith;
(C) a rotatable tapered plug valve member operably disposed in said recess and having a fluid flow passage therethrough adapted to have its ends connected and disconnected with the inner ends of said body passages upon appropriate rotation of said plug valve member, said plug valve having an upstanding tongue at its outer end,
  (a) and the inner end of said plug valve member being spaced from the closed end of the recess in said plastic body;
(D) a cylindrical pressure plate rotatably disposed in said neck passage and having a diametrical groove in the inner side in which the tongue of the plug valve member is disposed whereby rotation of said pressure plate effects rotation of said plug valve member;
(E) a stem for said pressure plate, said stem extending axially outwardly of said plate and neck;
(F) a pressure plate operating handle on said stem;
(G) a cap threadably connected with said neck, said cap having an end wall with an opening therein operably receiving said stem;
(H) and resilient means between the said cap and said plug valve member for applying inward pressure on said plug valve member.

7. The invention defined by claim 6, wherein said resilient means comprises a Belleville spring.

8. A plug valve mechanism for controlling the flow of fluids, comprising:
(A) a valve body of plastic material having an inwardly tapering recess for a rotatable plug valve member, said recess having a wall closing its inner smaller end, said body having fluid flow passages therein connecting at their inner ends with said recess;
(B) a hollow, tubular housing of rigid material about at least a portion of said body and restraining said body under compression, said housing being open at the ends and having a neck normal to said housing, said neck having a cylindrical passage therethrough in axial alignment with said recess;
(C) a rotatable, tapered plastic plug valve member operably disposed in said recess and having a fluid flow passage adapted to have its ends connected and disconnected with the inner ends of said body passages upon appropriate rotation of said plug valve member, said plug valve having an annular groove in its outer end adjacent the periphery of said outer end, and an outwardly extending tongue on said outer end,
  (a) the inner end of said plug valve member being spaced from the closed end of the recess in said plastic body;
(D) a cylindrical pressure plate rotatably disposed in said neck passage and having a groove in the inner side in which the tongue of the plug valve member is disposed whereby rotation of said pressure plate effects rotation of said plug valve member;
(E) a stem for said pressure plate, said stem extending axially outwardly of said plate and neck;
(F) a pressure plate operating handle on said stem;
(G) a cap threadably connected with said neck, said cap having an end wall with an opening therein operably receiving said stem;
(H) and a resilient O-ring in the groove in the outer end of said plug valve member and engaged and compressed by the pressure plate for exerting inward pressure on said plug valve member upon tightening the cap on said neck.

9. A plug valve mechanism for controlling the flow of fluids, comprising:
(A) a body of plastic material having an inwardly tapering recess for a rotatable plug valve member, said body having fluid flow passages therein connecting at their inner ends with said recess;
(B) a hollow, tubular housing or rigid material about at least a portion of said body and restraining said body under compression, said housing being open at the ends and having a neck normal to said housing, said neck having a cylindrical passage therethrough of at least the same diameter as the outer, larger end of said recess and in axial alignment therewith;
(C) a rotatable tapered plug valve member operably disposed in said recess and having a fluid flow passage adapted to have its ends connected and disconnected with the inner ends of said body passages upon appropriate rotation of said plug valve member,
  (a) the inner end of said plug valve member being spaced from the closed end of the recess in said plastic body;
(D) a cylindrical pressure plate rotatably disposed in said neck passage and having an operative connection with the plug valve member whereby rotation of said pressure plate effects rotation of said plug valve member;
(E) a stem for said pressure plate, said stem extending axially outwardly of said plate and neck;
(F) a cap operably connected with said neck; and
(G) a Belleville spring on said stem engageable by said cap for exerting resilient inward pressure on said pressure plate and hence on said plug valve member.

10. In the method of making a valve body comprising:
(A) cooling a valve body of plastic material below normal room temperature;
(B) inserting the chilled plastic body inside a housing of smaller dimensions than said plastic body when both said housing and said body are at normal room temperature; and
(C) machining a recess therein for operable reception of a rotatable valve member therein and after allowing the body to warm up to room temperature.

11. In the method of making a resilient plastic plug valve body comprising compressing said body and machining a recess therein for a valve member while maintaining said body under compression.

12. In the method of making a valve body, the steps:
(A) cooling a valve body of plastic material below a predetermined temperature;
(B) and inserting the cooled plastic body inside a housing of smaller interior size than said plastic body when both said housing and said body are at said predetermined temperature and cutting a recess in said body for operable reception of a rotatable valve member after allowing said body to warm up to said predetermined temperature.

13. In a plug valve mechanism for controlling the flow of fluid:
(A) a body of plastic material, said body having a recess for a plug valve member and fluid flow passages connected therewith;

(B) a rigid housing on at least a portion of said plastic body, said housing including a tubular neck and said plastic body having a concave socket aligned with said neck, one of the passages of the body having one end connected with said socket;

(C) a rotatable plug valve member operably disposed in said recess and having fluid passage means movable into and out of communication with the passage of said body;

(D) a cap operably attached to said neck, said cap having an end wall with an opening therethrough;

(E) and a fluid flow conduit extending through said opening in said cap and having a terminal part, (a) said cylindrical part having a convex inner end seated in the socket of said body, said cap engaging a portion of said terminal part for securing said convex end in said socket.

14. A plug valve mechanism for controlling the flow of fluids, comprising:

(A) a body of plastic material having an inwardly tapering recess for a rotatable plug valve member, said body having fluid flow passages therein connecting at their inner ends with said recess;

(B) a hollow, tubular housing of rigid material about at least a portion of said body and restraining said body under compression, said housing being open at the ends and having a neck normal to said housing, said neck having a cylindrical passage therethrough communicating with the outer end of said recess and being of at least the same diameter as said outer end of said recess and in axial alignment therewith;

(C) a rotatable tapered plastic plug valve member operably disposed in said recess and having a diametrically extending fluid flow passage therethrough adapted to have its ends connected and disconnected with the inner ends of said body passages upon appropriate rotation of said plug valve member, (a) said outer end of said plug valve member extending into the inner end of said cylindrical passage of the housing neck, (b) and the inner end of said plug valve member being spaced from the opposite end of the recess in said plastic body;

(D) a cylindrical pressure plate rotatably disposed in said neck passage and having an operable connection with said plug valve member whereby rotation of said pressure plate effects rotation of said plug valve member;

(E) handle means connected with said pressure plate for actuation thereof;

(F) a cap operably attached to said neck, said cap having an end wall;

(G) and a spring reacting between the cap and said pressure plate for exerting pressure on said pressure plate and hence on the plug valve member.

References Cited

UNITED STATES PATENTS

| 2,925,625 | 2/1960 | Souza | 18—61 |
| 2,926,884 | 3/1960 | Clinkenbeard | 251—309 X |
| 2,950,081 | 8/1960 | Steinbuch et al. | 251—368 X |
| 3,192,943 | 7/1965 | Moen | 251—192 X |
| 2,889,733 | 6/1959 | Vanderhoof | 29—447 X |

FOREIGN PATENTS 1,064,281  12/1953  France.

M. CARY NELSON, *Primary Examiner.*

MICHAEL O. STURM, *Assistant Examiner.*

U.S. Cl. X.R.

251—309, 368